Nov. 24, 1959
W. H. TANKE ET AL
2,914,125
POWER LIFT SYSTEM
Filed July 11, 1955
6 Sheets-Sheet 1
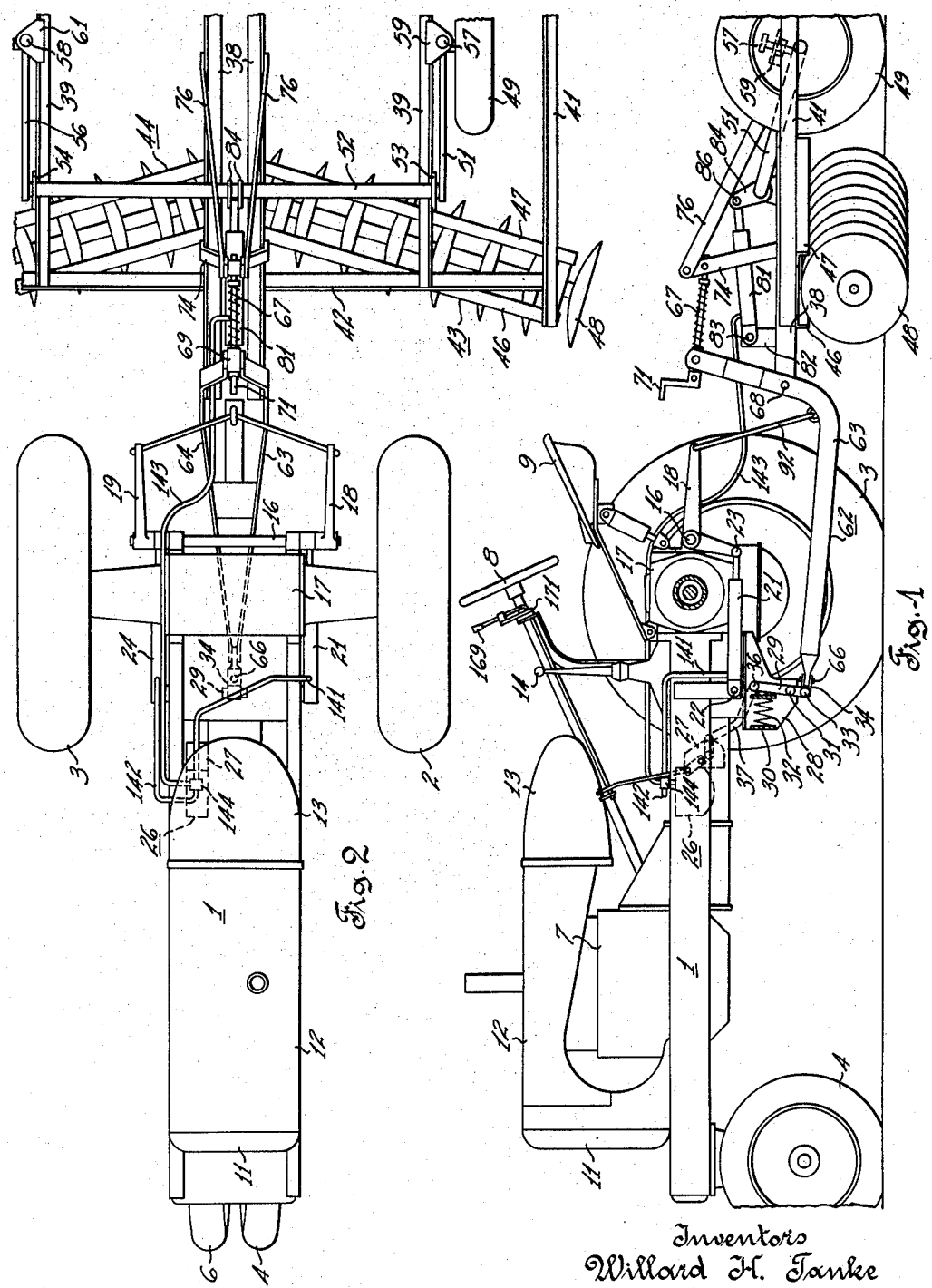
Inventors
Willard H. Tanke
Wendelin L. Voegeli
by
Attorney

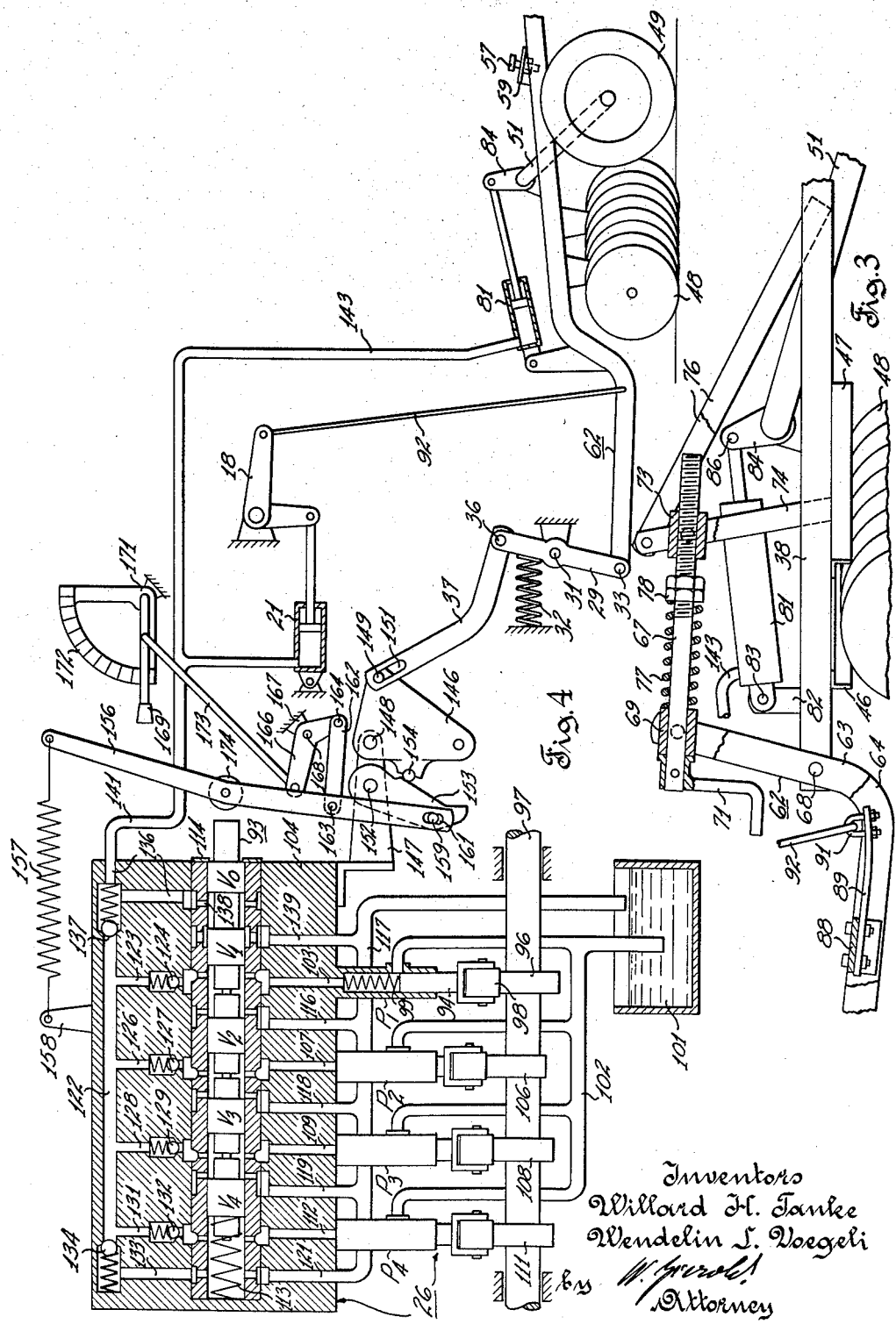

Inventors
Willard H. Tanke
Wendelin L. Voegeli
Attorney

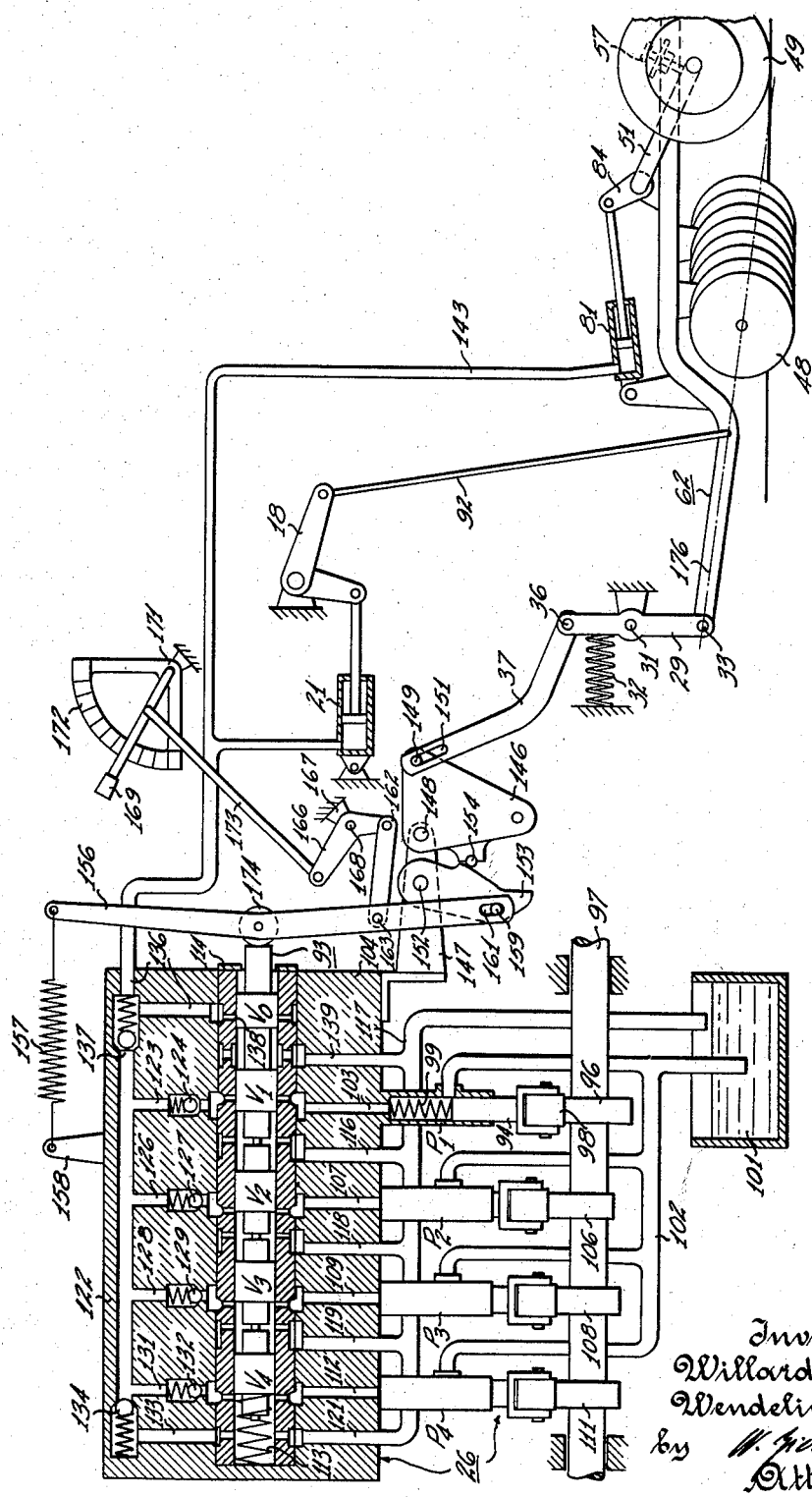

United States Patent Office 2,914,125
Patented Nov. 24, 1959

2,914,125

POWER LIFT SYSTEM

Willard H. Tanke, La Crosse, and Wendelin L. Voegeli, West Allis, Wis., assignors to Allis-Chalmers Manufacturing Company, Milwaukee, Wis.

Application July 11, 1955, Serial No. 521,016

3 Claims. (Cl. 172—8)

This invention relates to tractor propelled implements and it is concerned more particularly with a system for lifting such implements by power derived from the tractor engine.

Power lift systems for tractor propelled implements have heretofore been suggested, and various types of such systems are widely used, particularly for plows and other agricultural implements which require lifting for transport purposes. In addition to the principal function of lifting implements for transport purposes, certain control functions are usually performed by conventional power lift systems, it being a common practice, for instance, to provide for operation of the power lift system so as to continuously regulate the working depth of ground engaging tools, and/or to transfer a certain amount of weight from the implement to the tractor when operating conditions require increased ground pressure on the tractor drive wheels.

Traction boosting, that is, the transfer of implement weight to the tractor drive wheels by operation of a power lift system usually involves the provision of three major components, namely, a hitch mechanism, a power lift mechanism and a control mechanism for the power lift mechanism. The hitch mechanism connects the implement in up and down swingable, draft transmitting relation with the tractor, and in most cases the hitch mechanism is arranged so as to transmit forward pull from the tractor to an implement located rearwardly of the tractor drive wheels. The power lift mechanism is preferably operated hydraulically and in that case comprises an engine driven pump, a fluid motor, usually in the form of a ram, supplied with pressure fluid by the pump, and a lift force transmitting connection between the fluid motor and the implement. If the implement is located rearwardly of the tractor drive wheels, the ram usually operates a rock shaft on a rearward part of the tractor, and a pair of lift links are connected at their upper ends with rearwardly extending arms of the rock shaft, and at their lower ends in lift force transmitting relation with the implement. The control mechanism for the power lift mechanism serves to regulate the amount of lifting power which is applied to the implement by operation of the power lift mechanism and usually includes a manually adjustable lever or the like which may be selectively adjusted to an implement lowering position, to an implement raising position, and to an intermediate position, or several intermediate positions, which will cause the power lift mechanism to apply a regulated amount of lifting power to the implement in its lowered condition, such regulated amount of lifting power being less than the lifting power required to raise the implement to its transport position, but sufficient to transfer an appreciable amount of weight from the implement to the tractor rear wheels.

The use of traction boosting power lift systems of the hereinabove outlined character has been limited during the past because the transmission of lifting power from the tractor to an implement in rear of the tractor drive wheels sets up a downward force on the tractor at a fairly long moment arm which tends to raise the front end of the tractor. In order to preserve proper steering response of the tractor front wheels such downward force must be kept within a safe limit during raising of the implement for transport purposes as well as during operation of the power lift mechanism for weight transfer purposes. The mentioned safe limit depends on various factors such as the weight of the tractor and the location of its center of gravity, but generally it is considered necessary to limit the amount of weight which is transferred by operation of the power lift mechanism from the tractor front wheels to the tractor rear wheels so that the load carried by the tractor front wheels does not fall below the amount necessary for proper steering response.

For economical reasons, farm tractors are preferably designed to have a relatively low weight to horsepower ratio, and such tractors obviously present a problem as to the handling of implements of a size and weight commensurate with the available horsepower, but much too heavy for manipulation by a conventional traction boosting power lift system of the hereinabove outlined character. If it were attempted to carry such heavy implements on a relatively light but powerful tractor in a rearwardly overhanging condition as it has been customary with fully mounted or pickup type implements, the tractor front wheels would not only lose steering response but the whole tractor might turn over backward with consequent danger of injury to the operator.

Generally, it is an object of the present invention to provide an improved traction boosting power lift system for tractor propelled implements which avoids the hereinbefore outlined shortcomings of the prior art with respect to the operation of relatively heavy implements by tractors having a relatively low weight to horsepower ratio.

More specifically, it is an object of the invention to provide an improved power lift system for use with relatively light tractors and heavy implements which will be operable to raise the implement for transport purposes without objectionable loss of front wheel loading and without danger of backward overturning of the tractor.

A further object of the invention is to provide an improved power lift system of the mentioned character which will be operable to assist the tractor in pulling a relatively heavy implement under adverse conditions which might cause stalling of the tractor, such as an excessive increase of draft load and/or loss of traction due to wheel slippage.

A still further object of the invention is to provide an improved traction boosting power lift system of the hereinabove outlined character which will respond automatically to variations in draft load while the implement is advanced in working position, the system being operative to counteract the downward forces to which the implement is subjected during its advancement in working condition, and to vary such counteraction upon variation of the draft load so that the counteraction becomes stronger and the resulting weight transfer from the implement to the tractor becomes more effective as the draft load increases, and so that the counteraction becomes weaker and the resulting weight transfer becomes less effective as the draft load decreases. Such a mode of operation of the system has the advantage that the downward load on the tractor drive wheels is increased only when needed and no power is wasted by heavy downward loading of the tractor drive wheels when such loading is not needed.

The foregoing and other objects and advantages are attained by the present invention, various novel features of which will be apparent from the description herein and the accompanying drawings disclosing an embodiment of the invention, and will be more particularly pointed out in the appended claims.

Referring to the drawings:

Fig. 1 is a side view of a tractor and of a semitrail type disk harrow hitched to the tractor, the near rear wheel of the tractor being omitted for purposes of exposure and the rear part of the harrow carrying rear gangs of disks being likewise omitted;

Fig. 3 is a detail view, partly in section and on an enlarged scale, of a frame leveling mechanism incorporated in the harrow shown in Figs. 1 and 2; and Figs. 4 to 8, inclusive, are diagrammatic views of a traction boosting power lift system incorporated in the tractor and harrow combination shown in Figs. 1 and 2.

Figure 5:
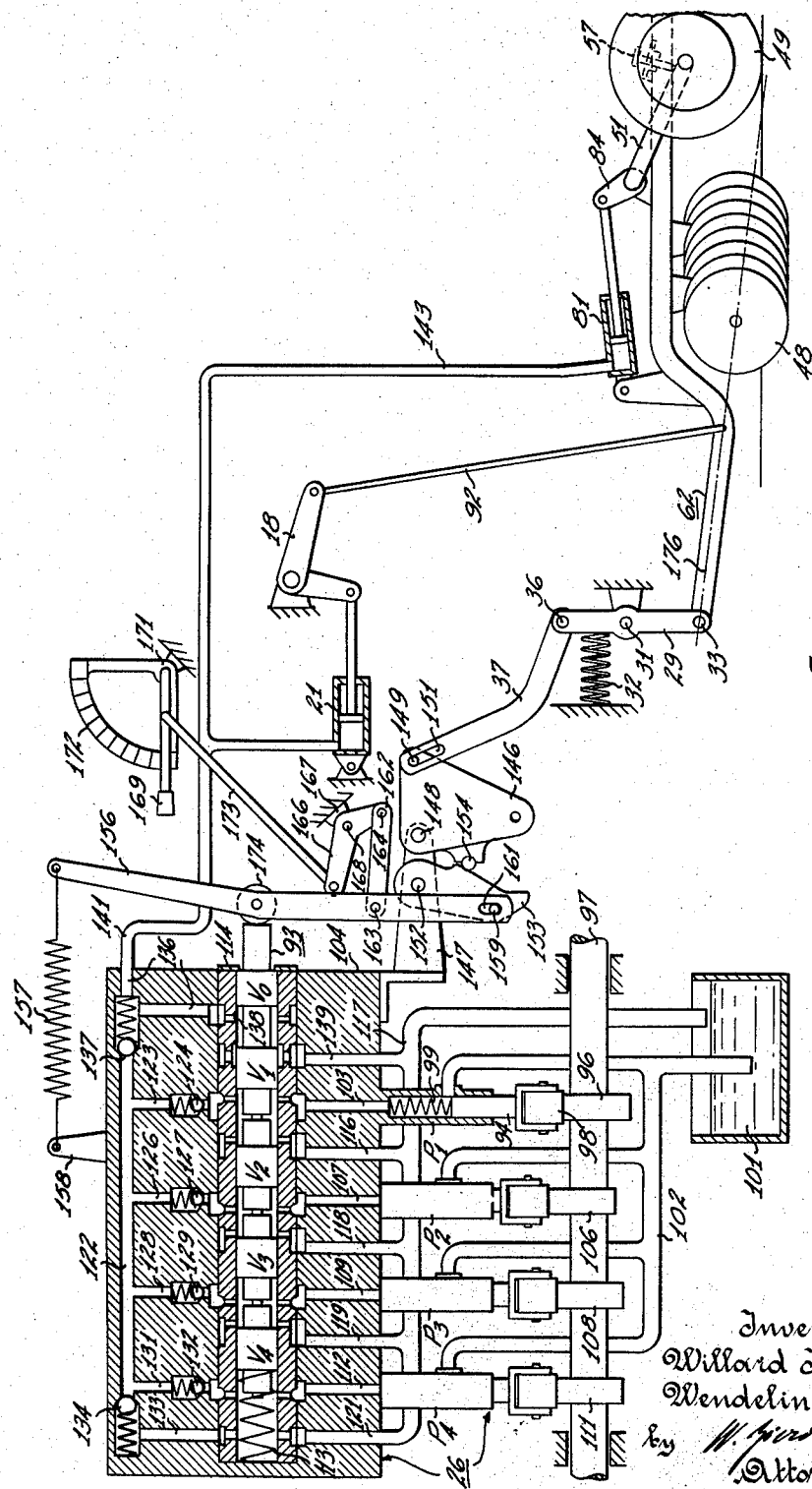

The tractor shown in Fig. 1 is of generally conventional construction in that it comprises a main body generally designated by the reference character 1, a pair of widely spaced rear traction wheels 2 and 3 (Fig. 2) and a pair of narrowly spaced front wheels 4 and 6.

An internal combustion engine 7 at a forward portion of the tractor furnishes power for driving the rear traction wheels 2 and 3, and a clutch, change speed transmission, differential gearing and final drive gears are provided in conformity with established practice to transmit power from the engine to the tractor drive wheels. The front wheels 4 and 6 are steerably mounted at the front end of the tractor main body 1 in conventional manner and a steering wheel 8, in front of an operator's seat 9, serves to adjust the front wheels 4 and 6 for steering purposes as desired. A radiator unit 11, hood 12, fuel tank 13 and gear shift lever 14 are arranged in their usual locations on the tractor main body.

Figure 2:
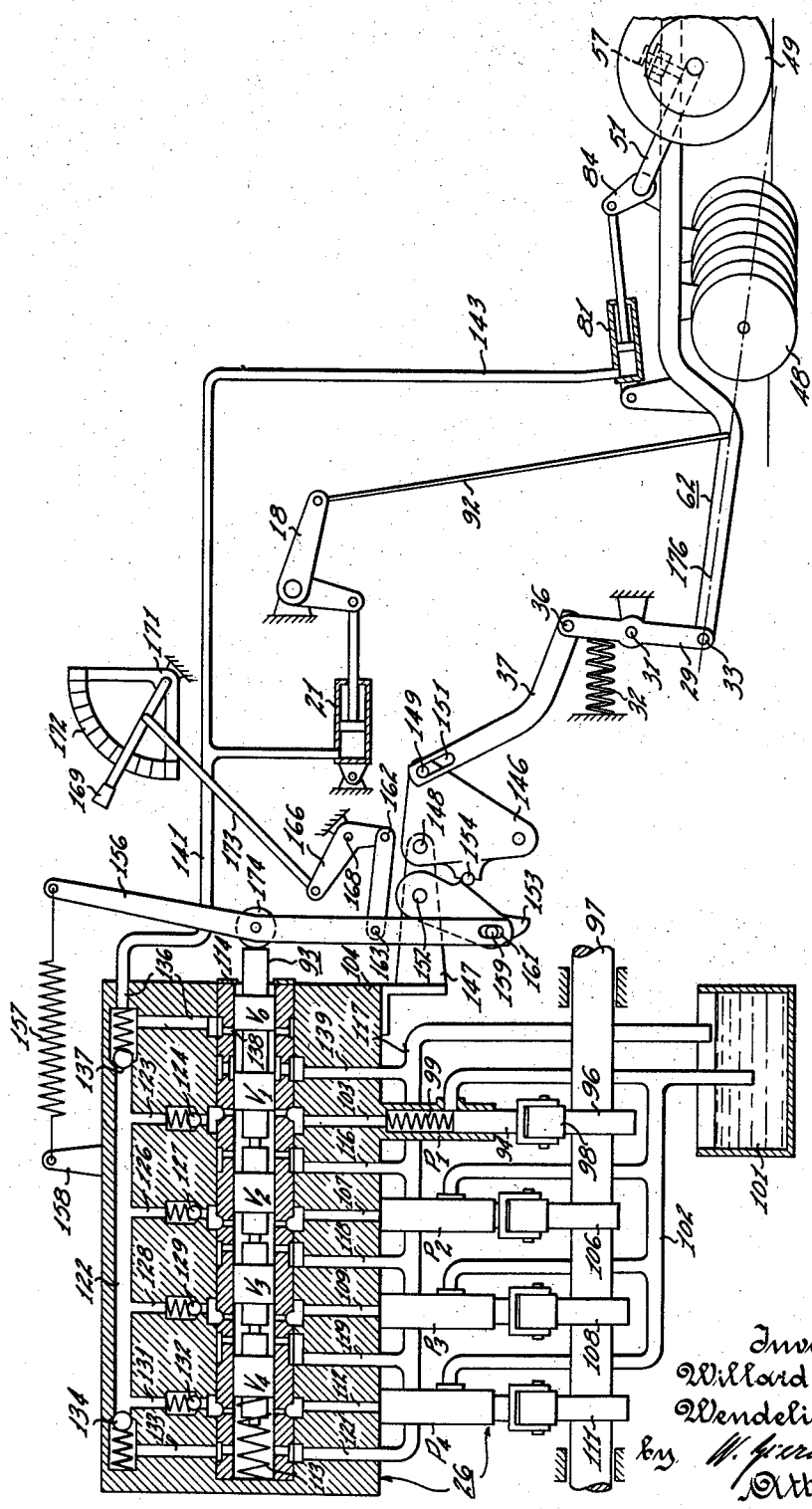
Fig. 2 is a top view of the tractor and disk harrow shown in Fig. 1.

The tractor shown in Figs. 1 and 2 is equipped with a power lift mechanism of a type which has heretofore been used in connection with farm tractors, and the details of which are disclosed, for instance, in U.S. Patent 2,679,199, granted May 25, 1954, to W. F. Strehlow for Power Lift Means Affording Depth Regulation of Tractor Propelled Implements. Briefly the power lift mechanism comprises a rock shaft 16 which is mounted on the rear axle housing 17 of the tractor for rotation on a horizontal, transversely extending axis and which is equipped at its opposite ends with bell crank levers 18 and 19, each having a relatively long rearwardly extending arm for connection in lift force transmitting relation with an implement at the rear of the tractor, and a relatively short downwardly extending arm for connection with a hydraulic ram. The actuating ram for the bell crank lever 18 is designed by the reference character 21 (Figs. 1 and 2) and is mounted at its barrel end on the tractor main body 1 by means of a pivot pin 22. The plunger end of the ram 21 is pivotally connected with the depending arm of the bell crank lever 18 by means of a pivot pin 23. The actuating ram for the bell crank lever 19 is generally indicated in Fig. 2 by reference character 24 and the explanations hereinbefore with respect to the mounting of the ram 21 on the tractor and its connection with the bell crank 18 similarly apply to the mounting of the ram 24 on the tractor and its connection with the bell crank 19.

The rams 21 and 24 are connected with a pressure fluid supply system which will be explained more fully hereinbelow in connection with Figs. 4 through 8 and which includes a pump and valve unit generally designated by the reference character 26, and a control mechanism, part of which is enclosed in a housing 27 attached to the pump and valve unit 26.

A hitch mechanism for connecting implements in drawn relation with the tractor is arranged at the underside of the tractor main body 1 in proximity to and forwardly of the rear axle housing 17 as best shown in Fig. 1. The hitch mechanism comprises a bracket 28 which is rigidly secured to the tractor main body; a rockable hitch lever 29 which is pivotally mounted on the bracket 28 by means of a pivot pin 31 for back and forth swinging movement on a horizontal transverse axis in vertically fixed relation to the tractor main body; and a strong coil spring 32 which is operatively interposed between the hitch lever 29 and an abutment 30 on the bracket 28 to yieldingly resist forward movement of the lever 29 about the pivot pin 31. Fig. 1 shows the hitch lever 29 in a generally vertical, slightly rearwardly inclined position, and the lower end of the lever 29, below the pivot pin 31, is suitably constructed for pivotal connection with a coupling member 34. Preferably, the lower end of the hitch lever 29 is bifurcated and has a pair of transversely aligned coupling pin receiving apertures so that the coupling element 34 may be straddled by the forked lower end of the hitch lever 29 connected thereto for up and down swinging movement about a vertically fixed pivot center by insertion of a horizontal coupling pin 33 through the aligned apertures of the hitch lever 29 and a registering aperture in the coupling element 34. Pivotally connected to the upper end of the rockable hitch lever 29 by means of a pivot pin 36 is a reach link 37 which extends forwardly and upwardly from the hitch lever 29 and is operatively connected at its upper forward end with an element of the control mechanism enclosed in the housing 27 as will be more fully explained hereinbelow with reference to Figs. 4 through 8.

The disk harrow as shown in Figs. 1 and 2 is of generally conventional construction in that it comprises a rigid assembly of longitudinally extending central frame members 38, a pair of transversely spaced longitudinally extending side frame members 39 and 41 at one side of the central frame members 38, a corresponding pair of the central frame members 38, and a plurality of transverse cross members, only one of which is shown in Fig. 2 and designated by the reference character 42.

Fig. 2 shows a disk gang 43 at the forward left hand part of the frame assembly 38, 39, 41, 42, and part of another disk gang 44 at the forward right hand part of the frame assembly. As actually constructed, the harrow includes an additional pair of left and right disk assemblies which have been omitted in the drawings, but which are mounted on the rear part of the frame assembly in conventional manner. The disk gang 43 comprises a pair of parallel frame bars 46 and 47 which are rigidly secured to the longitudinal frame bars 38, 39, 41 so as to extend horizontally outward from the central frame bars 38 in a forwardly inclined position, and a series of axially aligned dished disks 48 are rotatably mounted below the frame bars 46 and 47 in conventional manner. These explanations as to the mounting of the disks 48 of the gang 43 generally apply to the mounting of the disks of the gangs 44 and of the rear gangs, not shown. Gangs 43 and 44 are positioned in forwardly diverging relation to each other, and the disks of each gang are so mounted that their convex sides face toward the center of the harrow. The rear gangs, not shown, are preferably mounted in forwardly converging relation to each other and the disks of the rear gangs are positioned so that their concave sides face toward the center of the harrow. In these respects the harrow conforms with well known principles of construction.

In order to provide for travel of a disk harrow in nonworking condition, provisions are sometimes made to deangle the disk gangs, that is, to adjust the gangs for rotation of the disks on axes at right angles to the direction of travel. The harrow shown in Figs. 1 and 2 is not of the type which is transported on its disks, but is equipped with a pair of supporting wheels which may be raised and lowered relative to the frame assembly 38, 39, 41, 42, one of the supporting wheels being located at the left side of the harrow and designated by the reference character 49 in Figs. 1 and 2, and the other of the supporting wheels, not shown, being similarly located at the right side of the harrow. The supporting wheel 49 is rotatably mounted on the free end of a supporting arm 51 which is fixedly secured to a transversely extending rock shaft 52 in right angle relation to the latter. The rock shaft 52 is journaled at its opposite ends in bracket plates 53 and 54 secured to the longitudinally extending frame bars 39, and a support arm 56, corresponding to the supporting arm 51, is secured to the right hand end of the rock shaft 52 for mounting the other supporting wheel, not shown.

Suitable provisions are made for limiting upward swinging movement of the wheel supporting arms 51 and 56 relative to the frame assembly 38, 39, 41 and 42. While such provisions may be made in various forms, it is desirable that they afford an adjustable limit stop as diagrammatically indicated in Figs. 1 and 2. In these figures a pair of set screws 57 and 58 are mounted in overlying relation to the supporting arms 51 and 56, respectively, by brackets 59 and 61 rigidly secured to the longitudinal frame bars 39 at the left and right sides, respectively, of the harrow. In the condition of the harrow as shown in Fig. 1, the supporting arm 51 bears upwardly against the lower end of the set screw 57 and the supporting arm 56 at the other side of the harrow similarly bears against the lower end of the set screw 58. Downward adjustment of the set screw 57 from the position in which it is shown in Fig. 1, and corresponding downward adjustment of the set screw 58, will decrease the cutting depth of the harrow. Conversely, in order to increase the cutting depth of the harrow, the set screws 57 and 58 may be adjusted upwardly relative to the frame assembly.

Attachment of the harrow to the coupling member 34 on the tractor is accomplished by means of a draft structure, generally designated by the reference character 62. As shown in Fig. 2, opposite side members 63 and 64 of the draft structure 62 converge forwardly and extend under the rear axle of the tractor for connection with the coupling element 34. Suitable provisions are made for connecting the draft structure 62 at its forward end to the coupling member 34 on the tractor in horizontally swingable relation to the latter. For that purpose an eye may be formed on the forward end of the draft structure 62 for engagement with a rearwardly extending portion of the coupling element 34, and a coupling pin 66 (Fig. 2) may be inserted through a vertical hole in the coupling element 34 and into the eye at the forward end of the draft structure 62.

At the rear end of the draft structure 62 the side members 63 and 64 extend upwardly in generally parallel relation to each other and then converge toward each other to form a support for an adjusting screw 67. The central frame members 38 of the harrow extend forwardly into the space between the side members of the draft structure 62 and a transverse pivot pin 68 extends through the side members 63 and 64 of the draft structure 62 and through the adjacent forward portions of the central frame members 38 so as to connect the draft structure and the entire frame assembly 38, 39, 41, 42 for relative angling movement about the axis of the pivot pin 68. As shown in Fig. 3, the adjusting screw 67 has a smooth cylindrical shank portion which extends through a swivel block 69 in axially slidable relation to the latter. Rigidly secured to the forward end of the adjusting screw 67 is a crank 71 for turning the adjusting screw in the swivel block 69. The swivel block 69 is straddled by the bifurcated upper rear end of the draft structure 62 and has opposite trunnions rotatably supporting the swivel block 69 for movement relative to the draft structure 62 on a transverse axis as indicated in Fig. 3. A threaded portion of the adjusting screw 67 in rear of the smooth shank portion is operatively engaged with an internally threaded swivel block 73. A pair of upstanding bracket plates 74 are secured at their lower ends to the frame member 38 and converge upwardly so as to straddle the swivel block 73, the latter being journaled on the bracket plates 74 for rocking movement on a transverse axis in a manner similar to that explained hereinbefore in connection with the swivel block 69. The bracket plates 74 are braced by a pair of struts 76 which are secured to the upper ends of the bracket plates 74 above the swivel block 73 and extend downwardly and rearwardly therefrom into overlapping engagement with the central frame members 38 to which they are rigidly secured in any suitable manner. A strong coil spring 77 surrounds the adjusting screw 67 in rear of the swivel block 69 and reacts between the latter and a nut 78 in cooperative engagement with the threaded portion of the adjusting screw 67. The nut 78 is drawn up so as to place the coil spring 77 under appreciable compression, and a jam nut is drawn up against nut 78 so as to secure the latter in adjusted position.

The purpose of the adjusting screw 67 is to angularly adjust the frame assembly 38, 39, 41 and 42 relative to the draft structure 62 and to permit yielding upward movement of the frame assembly 38, 39, 41 and 42 relative to the draft structure 62 under certain operating conditions. When the crank 71 is rotated in one direction the distance between the swivel blocks 69 and 73 will be shortened and as a result the rear end of the frame assembly will be raised relative to the draft structure 62 about the pivot pin 68. Similarly, when the crank 71 is rotated in the opposite direction the rear end of the frame assembly will be lowered about the pivot pin 68. The spring 77, as stated hereinbefore, is under appreciable compression and will normally resist upward swinging movement of the frame assembly about the pivot pin 68. Downward swinging movement of the frame assembly about the pivot pin 68 will be positively prevented in any adjusted position of the screw 67 by axial engagement of the crank 71 with the swivel block 69. If the harrow is advanced in cutting position, which will be explained more fully hereinbelow, the front gangs may drop into a depression and in that case the spring 77 will yield and permit the front disk to remain in contact with the ground.

The adjusting screw 67 may also be manipulated to vertically adjust the forward end of the draft structure 62 while the harrow rests on its disks, the purpose of such adjustment being to bring the hitch eye at the forward end of the draft structure 62 into vertical registry with the coupling element 34 on the tractor preparatory to establishment of the hitch connection by means of the coupling pin 66.

For purposes of the present invention, the feature of angular adjustment of the harrow frame assembly 38, 39, 41 and 42 relative to the draft structure 62 about the pivot pin 68 is significant in that downward swinging movement of the frame assembly 38, 39, 41, 42 about the pivot pin 68 is positively prevented by axial engagement of the crank 71 with the swivel block 69.

Figure 8:
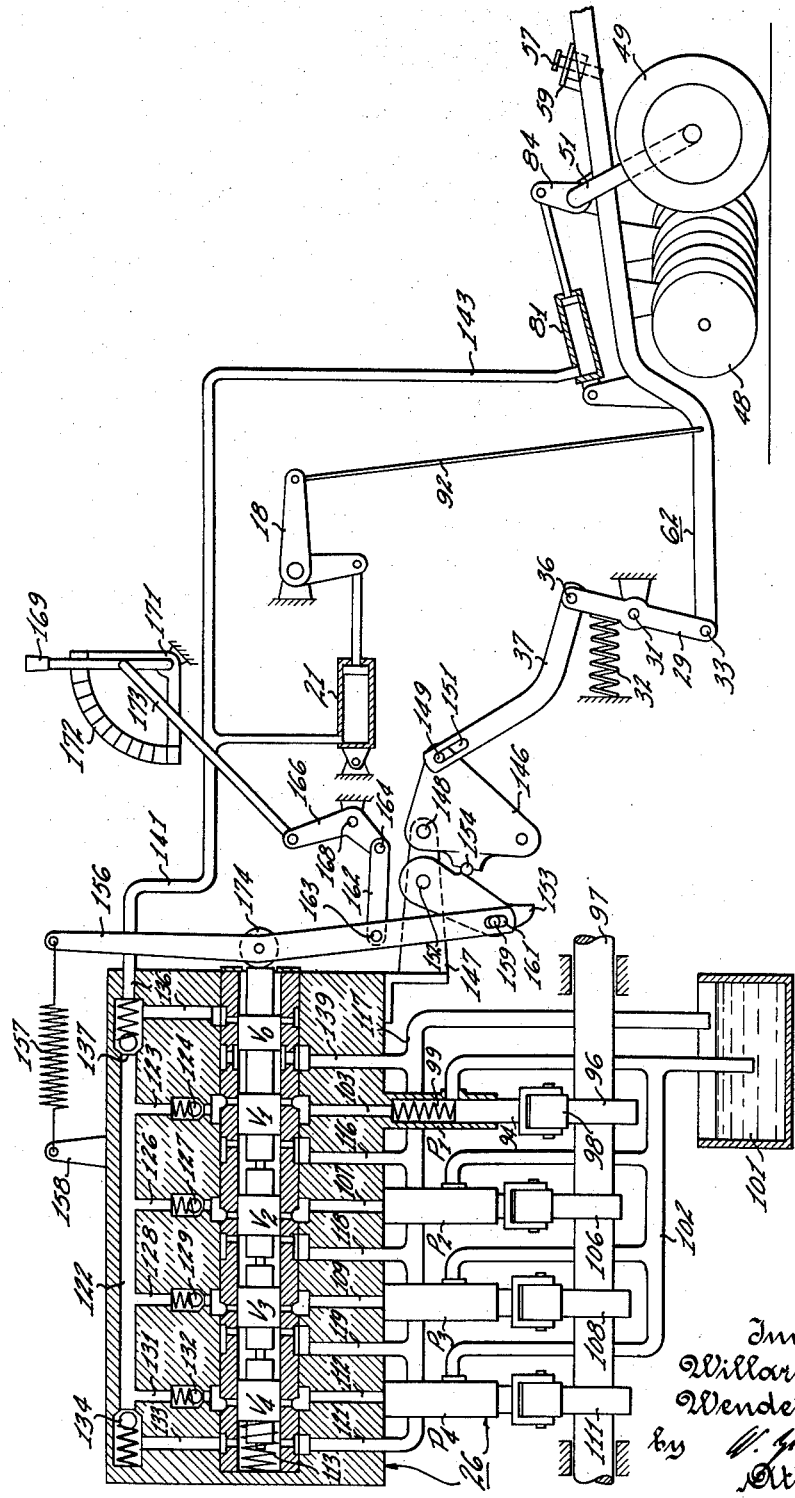

In order to adjust the harrow supporting wheel 49 at the left side of the harrow and the corresponding supporting wheel, not shown, at the right side of the harrow from the implement lowered position, in which the wheel 49 is shown in Fig. 1, to an implement raised position, as indicated in Fig. 8 a hydraulic ram 81 is mounted on the central frame members 38 and operatively connected with the rock shaft 52. As shown in Fig. 1, the barrel end of the ram 81 is pivotally secured to an upstanding bracket 82 by means of a pivot pin 83, and the plunger end of the ram 81 is connected to a radial arm 84 of the rock shaft 52 by means of a pivot pin 86. As will be described more fully hereinbelow, fluid pressure may be admitted to the ram 81 by means of a conduit 143 so as to extend the ram and thereby force the harrow supporting wheels downwardly with the result that the frame assembly 38, 39, 41, 42 and the draft structure 62 will swing upwardly about the vertically fixed pivot center 33 on the tractor and the disks will be raised out of engagement with the ground, as indicated in Fig. 8. In order to lower the disks, pressure fluid may be emitted from the rams 21, 24 and 81, as will be explained more fully hereinbelow.

In order to provide for the hereinbefore mentioned lift connection between the rearwardly extending arms of the bell crank levers 18 and 19 and the disk harrow, a cross brace 88 is mounted between and rigidly secured to the side members 63 and 64 of the draft structure 62. A longitudinally extending heavy plate metal leaf 89 is rigidly secured at its forward end to cross brace 88 and a U-bolt 91 is secured in inverted position on the rear end of the leaf 89 to form a loop at the upper side of the latter. A chain or cable 92 is passed through the loop formed by the U-bolt 91, and the chain or cable 92 is anchored at one end on the rearwardly extending arm of the bell crank lever 18 and at the other end on the rearwardly extending arm of the bell crank lever 19. The length of the chain or cable 92 is such that in the position of the parts as shown in Fig. 1 the cable will be substantially taut. As pointed out hereinbefore, the harrow is hitched to the tractor not only for vertical up and down swinging movement about the pivot center 33, but also for horizontal swinging movement about the vertical pivot pin 66 (Fig. 1). The chain or cable 92 affords a horizontally swingable lift connection between the bell crank levers 18 and 19 and the disk harrow. In operation, the tractor will pull the harrow through the hitch connection at 33 and 34, and when the tractor is driven to the right or left the draft structure 62 will swing from the position in which it is shown in Fig. 2, either toward the rear wheel 2 or the rear wheel 3 about the pivot pin 66 depending on the direction in which the turn is made.

The bell crank levers 18 and 19 may become subject to lifting force at any time during operation of the harrow, as will be explained more fully hereinbelow, and if the tractor is steered to the right or left while the chain or cable 92 is kept under tension by operation of the rams 21 and 24, the loop 91 may slide along the tensioned chain or cable in order to accommodate relative horizontal angular displacement of the tractor and harrow about the vertical coupling pin 66.

Referring to Fig. 4, the pump and valve unit 26, which has been mentioned hereinbefore, comprises four reciprocable plunger pumps $P_1$, $P_2$, $P_3$ and $P_4$ representing a source of fluid pressure, and an axially reciprocable valve spool 93 having lands $V_1$, $V_2$, $V_3$ and $V_4$. The valve spool 93 represents a movable valve element for controlling the admission of fluid pressure from the pumps $P_1$, $P_2$, $P_3$ and $P_4$ into conduits 141 and 142 (Fig. 2), and the emission of fluid pressure from the latter into a vent passage 139 (Fig. 4), as will be explained more fully hereinbelow.

The pump $P_1$ has a plunger 94 which is reciprocated back and forth by an eccentric 96 on a rotary shaft 97, the eccentric 96 bearing against a roller 98 at the lower end of the plunger 94 and a coil spring 99 being mounted in the cylinder of the pump $P_1$ to urge the plunger 94 toward the shaft 97 and thereby maintain the roller 98 in engagement with the eccentric 96. The shaft 97 forms part of the power transmitting mechanism between the engine 7 and the tractor rear wheels 2 and 3, and the arrangement is such that the shaft 97 rotates when the engine 7 is running and the master clutch of the tractor is engaged. The pump $P_1$ draws liquid, preferably oil, from a sump 101 through a branch of the housing 104 for the valve spool 93. The usual check valves, not shown, are associated with the intake and outlet ports of the pump $P_1$ so that operation of the latter will continuously feed oil into the passage 103.

The foregoing explanation with respect to the pump $P_1$ similarly applies to each of the pumps $P_2$, $P_3$ and $P_4$. That is, the pump $P_2$ is operated by an eccentric 106 on shaft 97 and feeds oil into a passage 107; the pump $P_3$ is operated by an eccentric 108 on shaft 97 and feeds oil into a passage 109; and the pump $P_4$ is operated by an eccentric 111 on shaft 97 and feeds oil into a passage 112.

The valve spool 93 is axially slidable back and forth in the housing 104, and a coil spring 113 at the left end of the valve spool 93 reacts between the housing 104 and the valve spool 93 so as to urge the latter toward the limit position in which it is shown in Fig. 4 and which is determined by axial engagement of a land $V_0$ of the valve spool with an end stop 114.

In the position of the valve spool as shown in Fig. 4, the oil delivered by pump $P_1$ into the passage 103 passes from the latter through the space between the lands $V_1$ and $V_2$ into a branch 116 of the outlet manifold 117 and is returned by the latter to the sump 101. Similarly, the oil delivered by the pump $P_2$ into the passage 107 passes from the latter into the space between the lands $V_2$ and $V_3$ of the valve spool 93 into a branch 118 of the outlet manifold 117 and is returned by the latter to the sump 101. The oil delivered by the pump $P_3$ into the passage 109 passes from the latter into the space between the lands $V_3$ and $V_4$ of the valve spool 93 into a branch 119 of the outlet manifold 117 and is returned by the latter to the sump 101. The oil delivered by the pump $P_4$ into the passage 112 passes from the latter into the space between the land $V_4$ and the left end wall of the valve housing 104 into a branch 121 of the outlet manifold 107 and is returned by the latter to the sump 101.

A pressure manifold 122, shown in the upper part of the valve housing 104 in each of Figs. 4 through 8 has a first branch 123 which is controlled by a check valve 124 and communicates, opposite to the passage 103, with the valve chamber enclosing the valve spool 93. A second branch 126 of the pressure manifold 122 is controlled by a check valve 127 and communicates, opposite to the passage 107, with the valve chamber enclosing the valve spool 93. A third branch 128 of the pressure manifold 122 is controlled by a check valve 129 and communicates, opposite to the passage 109, with the valve chamber enclosing the valve spool 93. A fourth branch 131 of the pressure manifold 122 is controlled by a check valve 132 and communicates, opposite to the passage 112, with the valve chamber enclosing the valve spool 93. A relief passage 133, which connects the left end of the chamber for valve spool 93 with the pressure manifold 122, is controlled by a pressure relief valve 134 which, as will be explained hereinbelow, serves as an unloading valve.

An internal passage 136 of the valve housing 104 at the upper right hand end of the latter, as shown in Fig. 4, has a check valve controlled port 137 in communication with the pressure manifold 122 and communicates with the right hand end of the chamber for the valve spool 93 through a port 138 which, as will be explained hereinbelow, is controlled by the land $V_0$. In the position of the valve spool 93 as shown in Fig. 4, the space between the lands $V_0$ and $V_1$ is in open communication with a branch 139 of the outlet manifold 117, but when the valve spool is shifted toward the left, as shown in Figs. 6 and 8, the port 138 is closed by the land $V_0$.

A conduit 141 connects the internal passage 136 of the valve housing 104 with the ram 21, as indicated diagrammatically in Fig. 4, and as shown more clearly in Figs. 1 and 2. The other ram 24 on the tractor is also connected with the internal passage 136, and a suitable connecting conduit 142 is indicated in Figs. 1 and 2. However, the tractor mounted ram 24 is not shown in the diagrammatic view of Fig. 4 because the rams 21 and 24 are in effect connected in parallel relation with each other and for practical purposes act as a single fluid motor. The hydraulic ram 81 on the harrow is connected with the internal passage 136 of the valve housing 104 in parallel with the rams 21 and 24, and this is schematically indicated in Fig. 4 by a conduit 143 which is connected with the barrel end of the ram 81 and leads into the conduit 141. In Figs. 1 and 2 the conduit 143 is shown as being connected to a fitting 144 on the tractor which serves to establish communication between the internal passage 136 (Fig. 4) of the valve housing 104 with the conduit 143 (Fig. 2) and with the conduits 141 and 142 (Fig. 2). All of the rams 21, 24 and 81 are of the single acting type, and it will readily be apparent that admission of fluid pressure simultaneously to all of the rams through the conduits 141, 142 and 143 will tend to extend the rams and that the rams may collapse if the conduits 141, 142 and 143 are opened to sump by uncovering of port 138.

The hitch lever 29 is shown in Fig. 4 in a more rearwardly tilted position than in Fig. 1, and the spring 32 is shown in a correspondingly expanded condition in which it yieldingly resists forward swinging movement of the lever 29 about the pivot center 31. The upper end of the lever 29 is pivotally connected with the reach link 37, and the statement has been made hereinbefore that the reach link 37 is operatively connected at its upper forward end with an element of the control mechanism enclosed in the housing 27. The mentioned control mechanism is diagrammatically indicated in Fig. 4 and comprises a generally triangular rocker 146 which is pivotally supported on a stationary bracket 147 by means of a pivot pin 148. The rocker 146 carries a stud 149 which projects into a slot 151 of the reach link 37. The stud 149 and slot 151 form a lost motion connection between the reach link 37 and the triangular rocker 146, and in the condition of the mechanism as shown in Fig. 4 the stud 149 is engaged by the upper end of the slot 151 so that the rocker will be prevented from anticlockwise movement, as viewed in Fig. 4, about the pivot pin 148 as long as the hitch lever 129 is in the indicated rearwardly inclined position.

Pivotally mounted on the bracket 147 by means of a pivot pin 152 is a secondary rocker 153 which bears at one side against a lug 154 on the triangular rocker 146. The secondary rocker 153 is biased anticlockwise, as viewed in Fig. 4, into engagement with the lug 154 by means of a floating lever 156 and a coil spring 157 which is operatively interposed between the upper end of the floating lever 156 and a bracket portion 158 of the valve housing 104 so as to urge the upper end of the floating lever 156 toward the left in Fig. 4.

The floating lever 156 has a pin and slot connection at its lower end with the secondary rocker 153, a pin 159 being secured to the secondary rocker 153 and extending through a slot 161 in the lower end of the floating lever 156. A hand operated mechanism for moving the floating lever 156 back and forth about its connection with the secondary rocker 153 comprises a link 162 which is pivotally connected at one end to the lever 156 by means of a pivot pin 163 and at its other end by means of a pivot pin 164 to a bell crank lever 166. The bell crank lever 166 is pivotally supported at its fulcrum on a stationary bracket 167 by means of a pivot pin 168 and adjustment of the bell crank lever about the pivot pin 168 may be effected by means of a hand lever 169, shown in the upper part of Fig. 4 and also in proximity to the steering wheel 8 in Fig. 1. The hand lever 169 is pivotally mounted on a suitable support 171 mounted on the steering column of the tractor, the support 171 including quadrant 172 along which the hand lever 169 may be moved to the various positions in which it is shown in Figs. 4 through 8. A suitable detent mechanism, not shown, is provided for releasably retaining the hand lever 169 in any position of adjustment along the quadrant 172. Pivotal movement of the hand lever 169 about its pivot center on the bracket 171 is transmitted to the bell crank lever 166 by means of suitable linkage diagrammatically represented in Fig. 4 by the link 173. Upward adjustment of the hand lever 169 from the position in which it is shown in Fig. 4 causes clockwise movement of bell crank lever 166 about its pivot center 168, and corresponding anticlockwise movement of floating lever 156 about pivot pin 159 on secondary rocker 153. The floating lever 156 is arranged in such relation to the reciprocable valve spool 93 that the latter may be moved to the left in opposition to the action of the spring 113 by movement of the floating lever 156 toward the left from the position in which it is shown in Fig. 4, the lever 156 having a suitable contact boss 174 for cooperative engagement with the right end face of the valve spool 93.

The herein disclosed power lift system is operable to accomplish two principal functions, namely, first, to adjust the harrow selectively to a transport position which is diagrammatically indicated in Fig. 8 and to a working position such as indicated in Figs. 5, 6 and 7; and second, to transfer weight from the harrow to the rear wheels of the tractor when such weight transfer becomes desirable in order to keep the tractor moving under severe operating conditions. The principal advantage of the system resides in the fact that it provides for handling of a relatively large and heavy implement by a powerful tractor whose weight to horsepower ratio is relatively small. For example, the tractor may have an engine which is capable of developing forty-five horsepower, but the operating weight of the tractor may only be about 4700 pounds. Assuming that the general overall construction of the tractor conforms with accepted practice, the normal load carried by the rear wheels 2 and 3 would be about seventy percent of the total tractor weight, that is, about 3300 pounds, and the normal load carried by the front wheels 4 and 6 of the tractor would be about thirty percent of the total tractor weight or about 1400 pounds. On the other hand, the harrow may be assumed to have a total weight of about 1900 pounds and a total of about forty disks of sixteen inches diameter each. That is, the harrow would be of a size to take full advantage of the available horsepower of the tractor, but offer such high resistance to propulsion at a desirable cutting depth that the normal vertical load on the tractor rear wheels of about seventy percent of the total tractor weight would be inadequate to afford the necessary grip of the tractor drive wheels for advancing the harrow, not only under normal soil conditions, but also under unfavorable soil conditions as may be encountered, for instance, after a rain when the ground is slippery and considerable power is required to move the disks through the soil.

Another problem presented by the assumed circumstances is the fact that the harrow weight is much too great for carrying the harrow entirely on the tractor during transport, that is, in the manner in which pickup type implements of relatively light weight have heretofore been transported. If the hydraulic servomotor 81 were omitted and an attempt were made to lift the harrow solely by operation of the tractor mounted rams 21 and 24, the front end of the tractor would swing up about the axis of the rear wheels 2 and 3 before the heavy weight of the harrow would be picked up by the power lift cranks 18 and 19. Obviously, the inability of the tractor to raise the harrow for transport purposes without undue loss of front wheel loading and consequent loss of steering response would be very objectionable from a practical standpoint, and the tendency of the tractor to turn over rearward would present a serious hazard for the operator.

The provision of the herein disclosed power lift system avoids all of the mentioned difficulties, that is, it insures adequate grip of the tractor drive wheels to utilize the full power of the engine for propulsion purposes; it permits adjustment of the harrow to a transport position, as shown in Fig. 8, without subjecting the tractor front end to an undesirably high lifting force; and it eliminates the hazard presented by a turning over of the tractor rearwardly about the axis of the tractor rear wheels.

The mechanism including the lever 29, spring 32, linkage 37, 146, 153, 156 and spring 157 represents actuating means for the movable valve element 93. These actuating means are operatively connected with the implement frame including the frame members 38, 39, 41 and draft structure 62. As will be explained more fully hereinbelow, the actuating means for the valve element 93 are responsive to variations of the draft force which is transmitted to the implement frame by the tractor, and the conduit 141 and the rams 21, 24 and 81 are placed under a fluid pressure which increases and decreases in accordance with increase and decrease, respectively, of said draft force.

Considering first the operating condition of the system illustrated by Fig. 4, it will be noted that the hand lever 169 is adjusted to its extreme downward or implement lowering position and that the disks of the harrow rest on the ground, but have not yet entered the ground to any appreciable cutting depth. This is a condition which will usually be obtained when the tractor and attached harrow are driven to the field and the control lever 169 is moved all the way down while the tractor is standing still. In this condition the tractor develops no drawbar pull and, accordingly, the spring 32 will keep the hitch lever 29 in the rearwardly inclined position in which it is shown in Fig. 4. The control spring 157 for the floating lever 156 will tend to swing this lever anticlockwise about the pivot center 163 and as a result the pin and slot connection between the lower end of the floating lever 156 and the secondary rocker 153 will bias the secondary rocker 153 anticlockwise about the pivot pin 152 and into engagement with the lug 154 on the triangular rocker 146. The resulting anticlockwise bias on the triangular rocker 146 urges the stud 149 against the upper end of the slot 151, but with relatively light pressure which is ineffective to cause any appreciable forward swinging movement of the hitch lever 29 about its pivot center 31 against the action of the heavy coil spring 32.

In the adjusted position of the floating lever 156, as shown in Fig. 4, the contact boss 174 on the floating lever is spaced an appreciable distance from the right end of the valve spool 93. The lands $V_0$, $V_1$, $C_2$, $V_3$ and $V_4$ are so arranged that in the position of the spool 93, as shown in Fig. 4, the oil discharge from the pumps $P_1$, $P_2$, $P_3$ and $P_4$ will return to the sump 101, as has been explained hereinbefore, without setting up any pressure in the pressure manifold 122 and the port 138 is uncovered by the land $V_0$ so that any oil which may be pushed out of the rams 21, 24 and 81 during the lowering of the harrow from its transport position (Fig. 8) to its rest position (Fig. 4) may freely return to sump through the conduits 141, 142, internal passage 136 and branch 139 of outlet manifold 117.

Fig. 5 shows the valve spool 93 in the same position as that in which it is shown in Fig. 4, and the hand lever 169 is also shown in the same position in which it is shown in Fig. 4. However, the disk harrow is shown in a working position in which the disks are lowered to a substantial cutting depth and which is determined, as explained hereinbefore, by the setting of the adjusting screws 57 and 58. The condition of the system as illustrated in Fig. 5 may be obtained when the tractor is started to move forward after the lever 169 has been moved to its implement lowered position and the harrow has thereby been caused to rest on its disks, as explained hereinbefore in connection with Fig. 4. In the condition illustrated by Fig. 5 the tractor develops considerable drawbar pull which causes the hitch lever 29 to swing forwardly from the position in which it is shown in Fig. 4 against the action of the coil spring 32. Such forward swinging of the lever 29 is transmitted to the reach link 37 and as a result the triangular rocker 146 will turn in anticlockwise direction to a limited extent about its pivot pin 148 under the bias to which it is subjected by the control spring 157 which, as explained in connection with Fig. 4, tends to swing the floating lever 156 about its pivot center 163 and acts through the pin and slot connection 159, 161 to swing the second rocker 153 and the triangular rocker 146 in anticlockwise direction about their respective pivot pins 152 and 148.

For purposes of explanation it may be assumed that the forward pull, which is required to advance the disk harrow in the lowered position in which it is shown in Fig. 5, exceeds the drawbar pull which the tractor is able to develop under its normal rear wheel load of about 3300 pounds. That is, if the normal downward load on the rear wheels of the tractor is seventy percent of the total tractor weight, as mentioned hereinbefore, application of the full driving torque of the engine to the tractor rear wheels will cause the tractor wheels to slip and consequently the advance movement of the tractor will slow down or possibly stop altogether. The system, and particularly the coil spring 32, are so designed that when the hand lever 169 is in its fully lowered position, as shown in Fig. 5, and the drawbar load reaches the point where the tractor wheels begin to slip, as explained hereinbefore, the floating lever 156 will assume a position approximately as indicated in Fig. 5, that is, a position in which the contact boss 174 is just about ready to engage the right end of the valve spool 93 while the latter is in the limit position in which it is shown in Figs. 4 and 5. When the operator notices that the tractor slows down due to wheel slippage he may increase the grip of the tractor rear wheels by simply moving the hand lever 169 upward from its implement lowering to an intermediate or weight transfer position such as indicated, for instance, in Fig. 6.

Comparing Fig. 6 with Fig. 4, it will be noted that upward adjustment of the hand lever 169 from its implement lowering position, while the hitch lever 29 is in a forwardly adjusted position and the spring 32 is appreciably loaded due to heavy drawbar pull of the tractor, causes the floating lever 156 to swing to the left in Fig. 6 about the pivot pin 159 on the secondary rocker 153 so as to move the valve spool 93 to an adjusted position as illustrated in Fig. 6. In this position the port 138 of the internal passage 136 is closed by the land $V_0$ of the valve spool 93 and the land $V_1$ of the valve spool 93 has moved into a position which prevents the oil discharge from pump $P_1$ to pass into the branch 116 of the outlet manifold 117. Not being able to return to sump, the oil discharged from pump $P_1$ unseats the check valve 124 and builds up pressure in the pressure manifold 122. Continued delivery of oil from pump $P_1$ into the pressure manifold 122 unseats the check valve 137 and causes passage of pressure fluid into the ram conduits 141 and 143. Build up of pressure in the ram 21 (and the parallel ram 24) tends to swing the rearwardly extending arms of the bell cranks 18 and 19 upward and consequently places a substantial lift force upon the draft structure 62 through the chain or cable 92. The pressure set up in the pressure manifold 122 by operation of the pump $P_1$ is also communicated to the ram 81 on the disk harrow and tends to force the supporting wheels of the harrow downwardly and away from the set screws 57 and 58.

Under the conditions illustrated by Fig. 6, it is not desired that an appreciable lifting force be applied to the harrow frame by operation of the hydraulic ram 81, but at the same time the lifting force applied to the draft structure 62 and connected harrow frame should be appreciable so that a substantial amount of the weight of the harrow may be transferred to the tractor for the purpose of increasing the downward load on the tractor rear wheels. In order to accomplish this result, the rams 21 and 24 and associated lift force transmitting mechanism, including the bell cranks 18 and 19, and the ram 81 and associated thrust transmitting connections with the harrow support wheels, are so proportioned that the lifting force which is exerted upon the harrow frame by operation of the rams 21 and 24 upon admission of a predetermined fluid pressure to the conduits 141, 142 and 143 is many times greater than the upward thrust which is applied to the harrow by admission of said same predetermined fluid pressure to the ram 81.

When the pump $P_1$ begins to feed pressure fluid to the rams 21 and 24 and applies fluid pressure to the ram 81 upon shifting of the valve spool 93 to the left as indicated in Fig. 6, the resulting torque acting upon the rock shaft 52 is resisted by the weight of the harrow which pulls downward on the rearwardly extending arms of the bell cranks 18 and 19 through the cable or chain 92. It is not intended that the harrow should yield to this upward pull by bodily upward swinging movement of the draft structure 62 and harrow frame as a unit about the pivot pin 33 on the tractor. As the pressure in the pressure manifold 122 rises, the downward load component which is transmitted to the ground by the disks of the harrow becomes progressively smaller and a correspondingly increasing load becomes effective upon the tractor rear wheels. The downward load which is imposed under these circumstances upon the rearwardly extending arms of the bell crank levers 18 and 19 by the cable or chain 92 is opposed by the weight component of the tractor which acts downwardly upon the front wheels 4 and 6. In order to preserve proper steering response of the tractor, the front wheels should remain subject to a substantial load at all times, but in actual practice it has been found that a considerable amount of the normal downward load on the front wheels may be transferred to the rear wheels for traction boosting purposes without adversely affecting the steering response of the front wheels. If the harrow has a total weight of 1900 pounds and the normal front wheel loading of the tractor is about 1400 pounds, as has been assumed hereinbefore, it would be entirely practical for traction boosting purposes to transfer as much as 1100 pounds or approximately fifty-eight percent of the harrow weight to the tractor rear wheels by operation of the rams 21 and 24.

While the system is in the condition as illustrated in Fig. 6 three major downward load components are effective upon the rear wheels of the tractor, namely, first, the normal part of the total tractor weight which, as explained hereinbefore, may approximate seventy percent of the total operating weight of the tractor; second, a substantial portion of the implement weight, as for instance, fifty-eight percent; and third, a portion of the normal front wheel load such as ten percent of the total tractor weight. On the basis of the herein assumed weights, the normal rear wheel load of 3300 pounds on the tractor may thus be increased to as much as 4870 pounds by operation of the rams 21 and 24.

When the tractor is operated to advance the harrow in its cutting position, as illustrated by Fig. 6, with the hand lever 169 adjusted, as shown, to a weight transfer position, the drawbar pull of the tractor may increase or decrease as the harrow encounters various conditions of soil resistance. Should the soil resistance increase, the spring 32 will be further compressed and as a result the valve spool 93 will be moved further to the left with the result that the pump $P_2$ and possibly pumps $P_3$ and $P_4$ may start delivering pressure fluid into the pressure manifold 122 and to the rams 21, 24 and 81. Under extreme conditions of draft load, which may be encountered temporarily, the pressure in the manifold 122 may build up to the point where the cutting depth of the harrow will be decreased by the combined action of the rams 21, 24 and 81. After the condition of temporary excess draft requirement has been overcome, the spring 32 will force the hitch lever 29 to a rearwardly inclined position such as indicated in Fig. 7, and as a result the valve spool 93 will move toward the right to a position in which the fluid discharge from all pumps may return to sump through the outlet manifold 117, and in which the rams 21, 24 and 81 are placed in open communication with the branch 139 of the outlet manifold. Consequently, the rear wheels of the tractor will be automatically relieved of additional vertical loading whenever such additional loading is no longer required. When the hand lever 169 has been adjusted to a weight transfer position, such as shown for instance in Figs. 6 and 7, and if the lever is then left in that position, the system will operate automatically to transfer more or less weight from the implement to the tractor as required by changing conditions of soil resistance without changing the cutting depth of the disks, and the system will also function to automatically decrease the cutting depth of the disks if excessive draft requirements are encountered.

In Fig. 8 the hand lever 169 is adjusted to its extreme upward or implement raising position which places the valve spool 93 in a position of adjustment in which all four pumps $P_1$, $P_2$, $P_3$ and $P_4$ deliver pressure fluid into the pressure manifold 122 while the implement hitch lever 29 is in the same rearwardly inclined position in which it is shown in Fig. 4. Full application of fluid pressure from all pumps to the rams 21, 24 and 81 quickly builds up to the point where all rams are extended to the limit, as illustrated by Fig. 8, and in that condition the weight of the harrow is carried partly on the hitch lever 29 and partly on the harrow supporting wheels. After the rams have been fully extended by operation of the pumps $P_1$ through $P_4$, the pressure relief valve 134 is unseated automatically to permit return of excess pump discharge to the sump 101 through the passages 133 and 121. In actual practice provisions may be made to automatically shift the valve spool 93 to the position in which it is shown in Fig. 6 after the rams have been fully extended, as shown in Fig. 8, and for a fuller explanation of this particular feature reference may be had to the hereinbefore mentioned U.S. Patent 2,679,199.

The set screws 57 and 58 permit preselection of the cutting depth at which it is desired to operate the harrow. It will be noted that in the operative condition of the harrow, as shown in Fig. 5, pull of the tractor is transmitted to the harrow along a line which is generally downwardly and rearwardly inclined, as indicated by the dash dotted line 176. The draft force acting along the line 176 has an upwardly directed component and if conditions are such that this component of the draft is balanced by the weight and suction of the harrow the set screws 57 and 58 may be adjusted upwardly so as to leave the harrow supporting wheels in a free floating condition. It is therefore obvious that the set screws 57 and 58 are dispensable for the operativeness of the herein disclosed traction boosting power lift system in connection with a disk harrow, and particularly in connection with an implement such as a plow whose operating depth may be preselected by means of a beaming device comprising an adjusting mechanism, such as explained hereinbefore with reference to the crank 71 and screw 67.

In general terms, the hydraulic rams 21 and 24 represent a first fluid motor comprising relatively reciprocable piston and cylinder elements, and the hydraulic ram 81 represents a second fluid motor comprising relatively reciprocable piston and cylinder elements. The relatively reciprocable piston and cylinder elements of the tractor mounted fluid motor 21, 24 afford an expansible and contractible fluid chamber, and the relatively reciprocable piston and cylinder elements of the implement mounted fluid motor 81 likewise represent an expansible and contractible fluid chamber. The conduit 141 is in open communication with both of said expansible and contractible fluid chambers, and the branch 139 of the pump manifold 117 forms a vent passage which is selectively connectable with and disconnectable from the conduit 141. The crank structure 16, 18, 19 on the tractor and its associated lift force transmitting elements including the chain or cable 92 represent power transmitting means operatively connecting the first fluid motor 21, 24 with the implement frame including the draft structure 62 for effecting a progressively increasing weight transfer from the implement frame to the tractor in response to a progressive pressure increase of the operating fluid within the conduit 141. The rock shaft 52 and its associated lift force transmitting elements including the arms 51, 56 and 84 represent power transmitting means operatively connecting the second fluid motor 81 with the ground engaging supporting elements or wheels 49 for effecting upward adjustment of the implement frame from its lowered working position (Fig. 5) in response to pressure increase of the operating fluid in the conduit 141 and associated fluid chambers beyond a predetermined limit. The effective piston area of the first fluid motor, that is, the combined effective piston area of the rams 21 and 24 is substantially larger than the effective piston area of the second fluid motor 81, and the power transmitting means 16, 18, 19, 92 and 51, 52, 56, 84 which are connected, respectively, with the first and second fluid motors are relatively proportioned so that admission of operating fluid to the conduit 141 at a pressure sufficient to effect a substantial weight transfer from the implement frame to the tractor by operation of the first fluid motor will be ineffective to raise the implement frame from its working position by operation of the second fluid motor.

It should be understood that it is not intended to limit the invention to the herein disclosed forms and details of construction and that the invention includes such other forms and modifications as are embraced by the scope of the appended claims.

It is claimed and desired to secure by Letters Patent:

1. A traction boosting power lift system for a tractor and implement combination wherein an implement frame carrying ground engaging tool means is swingably adjustable relative to the tractor between lowered working and raised transport positions by means of an up and down movable ground engaging supporting element mounted on said implement frame; said system comprising first and second fluid motors mounted, respectively, on said tractor and implement frame and each having an expansible and contractible fluid chamber; a conduit in open communication with both of said fluid chambers; pump and valve means operatively associated with said conduit for selectively admitting operating fluid of variable pressure thereto; a vent passage selectively connectable with and disconnectable from said conduit; power transmitting means operatively connecting said first fluid motor with said implement frame for effecting a progressively increasing weight transfer from said implement frame to said tractor in response to progressive pressure increase of said operating fluid within said conduit; and power transmitting means operatively connecting said second fluid motor with said ground engaging supporting element for effecting upward adjustment of said implement frame from said lowered working position thereof in response to pressure increase of said operating fluid within said conduit beyond a predetermined limit.

2. A traction boosting power lift system as set forth in claim 1 and comprising relatively reciprocable piston and cylinder elements affording said expansible and contractible fluid chamber of said tractor mounted fluid motor, and relatively reciprocable piston and cylinder elements affording said expansible and contractible fluid chamber of said implement mounted fluid motor, the effective piston area of said first fluid motor being substantially larger than the effective piston area of said second fluid motor, and said power transmitting means which are connected, respectively, with said first and second fluid motors being relatively proportioned so that admission of operating fluid to said conduit at a pressure sufficient to effect a substantial weight transfer from said implement frame to said tractor by operation of said first fluid motor will be ineffective to raise said implement frame from its working position by operation of said second fluid motor.

3. A traction boosting power lift system for a tractor and implement combination wherein an implement frame carrying ground engaging tool means is swingably adjustable relative to the tractor between lowered working and raised transport positions by means of an up and down movable ground engaging suporting element mounted on said implement frame; said system comprising first and second fluid motors mounted, respectively, on said tractor and implement frame and each having an expansible and contractible fluid chambers; a conduit in open communication with both of said fluid chambers; a source of fluid pressure; means including a vent passage and a movable valve element for controlling the admission of fluid pressure from said source into said conduit and the emission of fluid pressure from the latter; actuating means for said movable valve element operatively connected with said implement frame and responsive to variations of draft force transmitted to the latter by said tractor so as to place said conduit and fluid chambers under a fluid pressure which increases and decreases in accordance with increase and decrease, respectively, of said draft force; power transmitting means operatively connecting said first fluid motor with said implement frame for effecting a progressively increasing weight transfer from said implement frame to said tractor in response to increase of said fluid pressure; and power transmitting means operatively connecting said second fluid motor with said ground engaging supporting element for effecting upward adjustment of said implement frame from said lowered working position thereof in response to said increase of said fluid pressure beyond a predetermined limit.

References Cited in the file of this patent
UNITED STATES PATENTS

| | | |
|---|---|---|
| Re. 24,006 | Acton | May 24, 1955 |
| 2,679,199 | Strehlow | May 25, 1954 |
| 2,687,680 | Heckathorn et al. | Aug. 31, 1954 |
| 2,713,296 | Silver et al. | July 19, 1955 |
| 2,723,613 | Walberg | Nov. 15, 1955 |